United States Patent
Asaumi et al.

(10) Patent No.: US 7,224,142 B2
(45) Date of Patent: May 29, 2007

(54) BATTERY LOAD POWER DETECTING SYSTEM

(75) Inventors: Hisao Asaumi, Wako (JP); Hiroaki Horii, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 326 days.

(21) Appl. No.: 10/876,744

(22) Filed: Jun. 25, 2004

(65) Prior Publication Data

US 2005/0024013 A1    Feb. 3, 2005

(30) Foreign Application Priority Data

Jul. 8, 2003    (JP)    ............... 2003-193250

(51) Int. Cl.
*H02J 7/00*    (2006.01)
*H05K 7/20*    (2006.01)

(52) U.S. Cl. .................. 320/104; 180/247; 180/242; 361/710

(58) Field of Classification Search ................ 320/104; 180/247, 242; 361/710
See application file for complete search history.

(56) References Cited

U.S. PATENT DOCUMENTS

| | | | |
|---|---|---|---|
| 5,247,441 A | * | 9/1993 | Serizawa et al. ............. 701/41 |
| 5,592,094 A | * | 1/1997 | Ichikawa .................... 324/427 |
| 5,778,997 A | * | 7/1998 | Setaka et al. ............... 180/65.2 |
| 6,208,923 B1 | | 3/2001 | Hommel |
| 2004/0061475 A1 | | 4/2004 | Mentgen et al. |

FOREIGN PATENT DOCUMENTS

| | | |
|---|---|---|
| DE | 3520985 | 1/1988 |
| DE | 10150378 A 1 | 4/2005 |
| JP | 06-054402 | 2/1994 |
| JP | 2000-053012 | 2/2000 |
| JP | 2000-333383 | 11/2000 |
| JP | 2002-190329 | 7/2002 |
| JP | 2002-542576 | 12/2002 |

* cited by examiner

*Primary Examiner*—Gary L. Laxton
*Assistant Examiner*—Yalkew Fantu
(74) *Attorney, Agent, or Firm*—Carrier, Blackman, & Associates, P.C.; Joseph P. Carrier; William D. Blackman

(57) ABSTRACT

A battery load power detecting system includes a generator current sensor which detects a current supplied from a generator to at least one of a battery and a load group including a steering device, and first and second load current sensors which detect a current supplied from at least one of the generator and the battery to the load group. A battery state monitor calculates a load power of the battery by multiplying a difference between both the currents by a voltage at a terminal of the battery detected by a voltage sensor. Therefore, the load state of the battery can be appropriately confirmed to avoid a situation where the steering device, e.g., a steering-by-wire type steering device, falls into an inoperable state due to power deficiency.

9 Claims, 2 Drawing Sheets

BATTERY LOAD POWER DETECTING SYSTEM

This application claims priority under 35 USC 119 from Japanese Patent Application No. 2003-193250, filed Jul. 8, 2003, the entire contents of which are incorporated herein by reference.

BACKGROUND OF THE INVENTION

1. Field of the Invention

The present invention relates to a battery load power detecting system for detecting a load power of a battery connected to a load group including a steering device for providing a steering torque by a motor and to a generator driven by an engine.

2. Description of the Related Art

In a steering-by-wire type steering device in which there is no mechanical connection between a steering wheel and a steering gear box, and a control means controls the driving of a motor mounted in the steering gear box based on an electric signal generated by the operation of the steering wheel thereby steering left and right wheels, if the state of a battery as a power source is deteriorated, there is a possibility that the steering of the wheels cannot be reliably carried out. Therefore, it is necessary to conduct the maintenance or replacement of the battery while accurately monitoring the load state of the battery.

A conventional power supply system for such a steering-by-wire type steering device has a single current sensor which is mounted on a line extending from the battery and a generator to a load group including the steering-by-wire type steering device, and the current sensor detects a load current supplied from the battery and/or the generator to the load group, thereby determining the load state of the battery.

The determination of the deteriorated state of a regular lead battery to be mounted on a vehicle is carried out based on an internal impedance, a specific gravity and temperature of a liquid electrolyte and the like, but such determination is troublesome, and determination accuracy is not satisfactory.

Published Japanese Translation No. 2002-542576 of PCT/US00/09705 and Japanese Patent Application Laid-open No. 2002-190329 disclose a system which performs life lengthening and determination of the deterioration of a battery, and Japanese Patent Application Laid-open No. 6-54402 discloses a system which measures remaining capacity of a battery for an electric vehicle.

In a system in which a current supplied to a load group is detected by a single current sensor, as in the power supply system for the conventional steering-by-wire type steering device, it is impossible to determine whether the current is supplied from a battery or a generator, so that it is impossible to properly determine the load state of the battery by detecting a current flowing directly into and out of the battery.

SUMMARY OF THE INVENTION

Accordingly, it is an object of the present invention to properly determine the load state of a battery for supplying a current to a load group including a steering device, thereby avoiding a situation where the steering device falls into an inoperable state due to power deficiency.

To achieve the above object, according to a first feature of the present invention, there is provided a battery load power detecting system for detecting a load power of a battery connected to a load group including a steering device adapted to provide a steering torque by a motor and to a generator driven by an engine, the system comprising: a voltage sensor for detecting a voltage at a terminal of the battery; a generator current sensor for detecting a current supplied from the generator to at least one of the battery and the load group; a load current sensor for detecting a current supplied from at least one of the generator and the battery to the load group; and a battery load power calculating means for calculating a load power of the battery, based on the voltage detected by the voltage sensor, the current detected by the generator current sensor and the current detected by the load current sensor.

With the above-described arrangement, the generator current sensor detects the load power of the current supplied from the generator to at least one of the battery and the load group; the load current sensor detects the current supplied from at least one of the generator and the battery to the load group; and the battery load power calculating means may, for example, calculate the load power of the battery by multiplying a difference between both the currents by the voltage at the terminal of the battery detected by the voltage sensor. Therefore, the load state of the battery can be properly confirmed, thereby avoiding a situation where the steering device falls into an inoperable state due to power deficiency.

According to a second feature of the present invention, in addition to the arrangement of the first feature, the load current sensor comprises a first load current sensor for detecting a current supplied from the battery to the steering device, and a second load current sensor for detecting a current supplied from at least one of the generator and the battery to all members of the load group excluding the steering device, and the battery load power calculating means controls an amount of power generated by the generator based on the current detected by the second load current sensor.

With the above-described arrangement, there are provided the first load current sensor for detecting a current supplied from the battery to the steering device and the second load current sensor for detecting a current supplied from at least one of the generator and the battery to all the members of the load group excluding the steering device, and the amount of power generated by the generator is controlled based on the current detected by the second load current sensor. Therefore, it is possible to prevent the rotational speed of the engine from frequently increasing and decreasing in order to increase and decrease the amount of power generated by the generator, each time the steering device which consumes a large amount of power is operated.

According to a third feature of the present invention, in addition to the arrangement of the first feature, the load current sensor comprises a single sensor, and the battery load power calculating means controls an amount of power generated by the generator based on the current detected by the load current sensor.

With the above-described arrangement, the single load current sensor detects the current supplied to the steering device and the current supplied to all the members of the load group excluding the steering device. Therefore, the number of the current sensors can be minimized to contribute to reduction in cost.

According to a fourth feature of the present invention, in addition to any of the first to third features, the battery load power calculating means calculates a remaining capacity of the battery from a multiplied value of the load power of the battery.

With the above-described arrangement, the battery load power calculating means calculates the remaining capacity of the battery from the multiplied value of the load power of the battery. Therefore, the load state of the battery can be further properly confirmed to reliably avoid a situation where the steering device falls into an inoperable state due to power deficiency.

A steering-by-wire type steering device 11 in the embodiments disclosed herein corresponds to the steering device of the present invention; a battery state monitoring means 15 in the embodiments corresponds to the battery load power calculating means of the present invention; and first and second load current sensors 17a and 17b in the embodiments correspond to the load current sensor of the present invention.

The above and other objects, features and advantages of the invention will become apparent from the following description of the present embodiments taken in conjunction with the accompanying drawings.

DESCRIPTION OF THE PRESENT EMBODIMENTS

Figure 1:
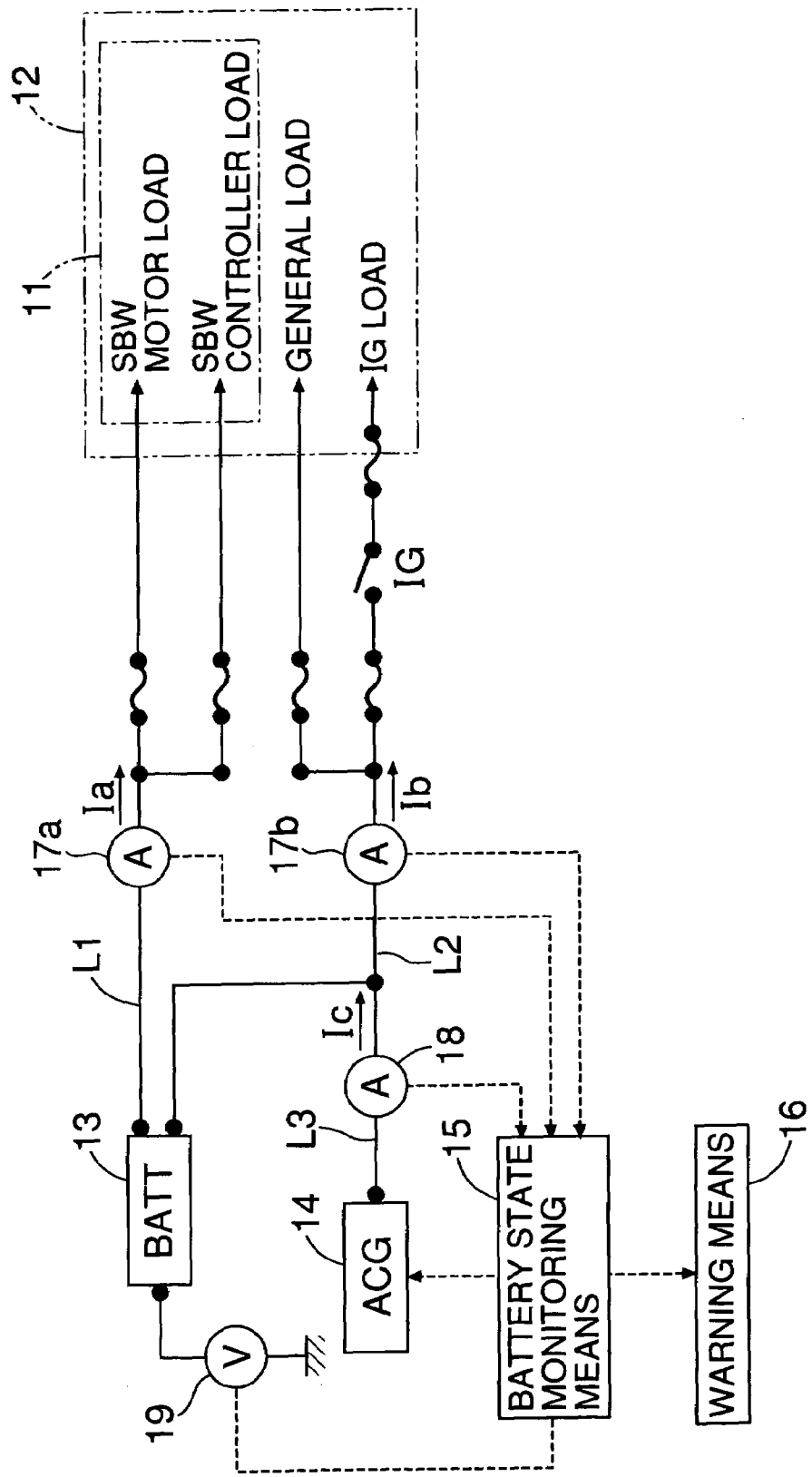
FIG. 1 is a block diagram of a battery load power detecting system according to a first embodiment of the present invention.

FIG. 1 shows a first embodiment of a system for supplying an electric power to a load group 12 including a steering-by-wire type steering device 11 for an automobile. The system includes a 12V 13 battery mounted on the vehicle, a generator 14 driven by an engine to generate an electric power, a battery state monitoring means 15 for monitoring a load power and a remaining capacity of the battery 13, and a warning means 16 comprising a lamp or LED connected to the battery state monitoring means 15.

The steering-by-wire type steering device 11 is a system in which the mechanical connection between a steering wheel and a steering gear box is cut off, and the driving of a motor mounted in the steering gear box is controlled by a control means based on an electric signal generated by the operation of the steering wheel to steer left and right wheels.

A first load current sensor 17a for detecting a load current Ia supplied from the battery 13 to the steering-by-wire type steering device 11 is disposed on a line L1 which interconnects the battery 13 and the steering-by-wire type steering device 11.

A second load current sensor 17b for detecting a load current Ib supplied from the battery 13 and/or the generator 14 to all members (a stator motor, head lights, wipers, an air-conditioner, an audio set and the like) of the load group 12 excluding the steering-by-wire type steering device 11 is disposed on a line L2 which interconnects the battery 13 as well as the generator 14 and all the members of the load group 12 excluding the steering-by-wire type steering device 11.

A generator current sensor 18 for detecting a generated current Ic supplied from the generator 14 to the battery 13 and/or all the members of the load group 12 excluding the steering-by-wire type steering device 11 is disposed on a line L3 which interconnects the generator 14 as well as the battery 13 and all the members of the load group 12 excluding the steering-by-wire type steering device 11.

A voltage sensor 19 for detecting a voltage at a terminal of the battery 13 is connected to the battery 13.

The battery state monitoring means 15, to which the first load current sensor 17a, the second load current sensor 17b, the generator current sensor 18 and the voltage sensor 19 are connected, is adapted to calculate the load state and the remaining capacity of the battery 13, to control the amount of power generated by the generator 14 or operate the warning means 16 to emit a warning depending on the result of the calculation.

The operation of the first embodiment having the above-described arrangement will be described below.

When a driver carries out a steering operation to actuate the steering-by-wire type steering device 11, an electric current is supplied from the battery 13 to the steering-by-wire type steering device 11, and the load current Ia is detected by the first load current sensor 17a. When all the members of the load group 12 excluding the steering-by-wire type steering device 11 is operated, the electric current is supplied from the battery 13 if the generator 14 is not in operation, or from both the battery 13 and the generator 14 if the generator 14 is in operation. In this case, the load current Ib flowing to all the members of the load group 12 excluding the steering-by-wire type steering device 11 is detected by the second load current sensor 17b.

Further, the generator current sensor 18 detects a current Ic generated by the generator 14. If the current Ic generated by the generator 14 is larger than the load current Ib flowing to all the members of the load group excluding the steering-by-wire type steering device 11, a current Ic−Ib (a positive value) corresponding to a difference between the current Ic and the load current Ib is charged to the battery 13. On the other hand, if the current Ic generated by the generator 14 is smaller than the load current Ib flowing to all the members of the load group 12 excluding the steering-by-wire type steering device 11, a current Ic−Ib (a negative value) corresponding to a difference between the current Ic and the load current Ib is discharged from the battery 13. Therefore, the total amount of current discharged from the battery 13 is represented by Ia−(Ic−Ib)=Ia+Ib−Ic.

For example, when Ia=10 A; Ib=20 A and Ic=30 A, Ia+Ib−Ic=0 A, so that 20 A of the current Ic=30 A generated by the generator 14 is supplied as the load current Ib to all the members of the load group 12 excluding the steering-by-wire type steering device 11, and the remaining 10 A is supplied as the load current Ia via the battery 13 to the steering-by-wire type steering device 11.

The battery state monitoring means 15 calculates a load power in the battery 13 by multiplying the current Ia+Ib−Ic discharged from the battery 13 by a voltage at the terminal of the battery 13 detected by the voltage sensor 19. When the load power is a positive value, the battery 13 discharges a current to decrease its remaining capacity. When the load power is a negative value, the battery is charged to increase its remaining capacity. A remaining capacity can be calculated by subtracting a value obtained by multiplying the load power of the battery 13 by time, from a capacity in a fully charged state of the battery 13.

The battery state monitoring means 15 controls the amount of current generated by the generator 14, based on the load current Ib supplied to all the members of the load group excluding the steering-by-wire type steering device 11, thereby controlling the amounts of current discharged from and charged to the battery 13 so that they are balanced. The reason why the load current Ia supplied to the steeringby-wire type steering device 11 is not taken into consideration in this process, is that the power consumed by the steering-by-wire type steering device 11 is large, and the operation and stoppage of the steering-by-wire type steering device 11 are repeated at short time intervals, and hence if the amount of power generated by the generator 14 is controlled base on the load current Ia, the rotational speed of the engine E driving the generator 14 constantly changes.

As described above, the battery state monitoring means 15 calculates the load power of the battery 13, based on the generated current Ic detected by the generator current sensor 18 and supplied from the generator 14 to the battery 13 and/or the load group 12, the load currents Ia and Ib detected by the first and second load current sensors 17a and 17b and supplied from the generator 14 and/or the battery 13 to the load group 12 and the voltage at the terminal of the battery 13 detected by the voltage sensor 19. Therefore, the discharge state including the remaining capacity of the battery 13 can be properly confirmed. When the remaining capacity of the battery 13 has been decreased to be smaller than a threshold value, the warning means 16 is operated to emit a warning to the driver, thereby avoiding a situation where the steering-by-wire type steering device 11 falls into a non-operable state due to power deficiency.

Figure 2:
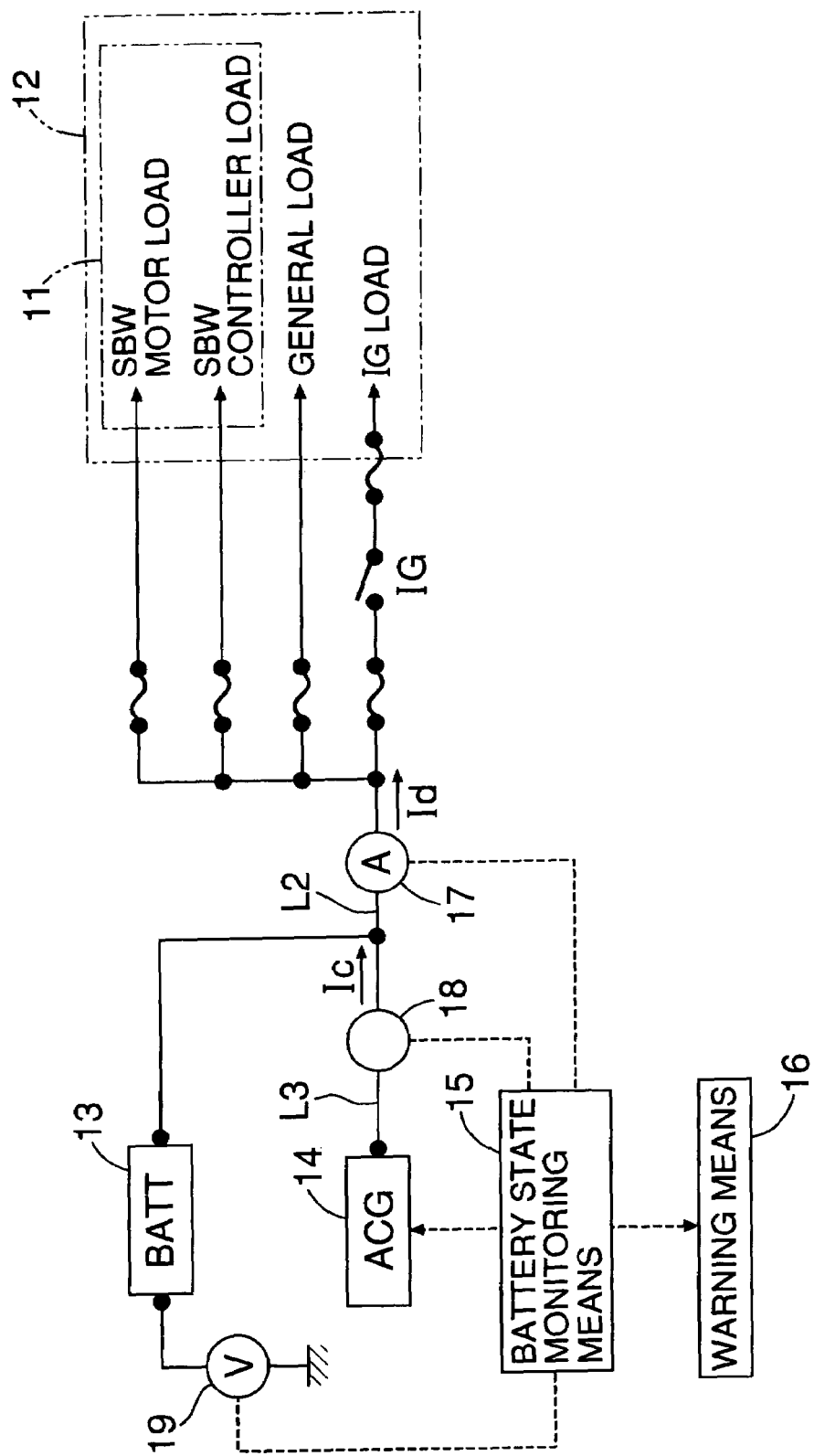
FIG. 2 is a block diagram of a battery load power detecting system according to a second embodiment of the present invention.

A second embodiment of the present invention will now be described with reference to FIG. 2. In the second embodiment, the same symbols and reference numerals as those in the first embodiment are affixed to components corresponding to those in the first embodiment, and the duplicated description is omitted.

In the second embodiment, all members of a load group 12 including a steering-by-wire steering device 11 are supplied with a current from a battery 11 and/or a generator 14, and a single load current sensor 17 is mounted for the entire load group 12.

Therefore, for example, when a load current Id detected by the load current sensor 17 is equal to 20 A, and a generated current Ic detected by a generator current sensor 18 is equal to 30 A, a current Ic−Id=10 A corresponding to a difference between the load current Id and the generated current Ic is charged to the battery 13. On the other hand, when the load current Id detected by the load current sensor 17 is equal to 30 A, and the generated current Ic detected by the generator current sensor 18 is equal to 20 A, a current Ic−Id=−10 A corresponding to a difference between the load current Id and the generated current Ic is discharged from the battery 13 to the load group 12.

Thus, also in the second embodiment, the battery state monitoring means 15 calculates a load power of the battery by multiplying a current Id−Ic discharged from the battery 13 by a voltage at a terminal of the battery 13 detected by a voltage sensor 19. When the load power is a positive value, the battery 13 discharges a current to decrease its remaining capacity. When the load power is a negative value, the battery 13 is charged to increase its remaining capacity. A remaining capacity can be calculated by subtracting a value obtained by multiplying the load power of the battery 13 by time, from a capacity in a fully-charged state of the battery 13.

In addition to the effects of the first embodiment, the second embodiment provides an effect that the number of the current sensors can be decreased from three to two, thereby reducing the cost. However, when the amount of power generated by the generator 14 is controlled based on the load current Ib supplied to the load group 12 including the steering-by-wire type steering device 11, power consumption becomes large and an amount of variation in rotational speed of the engine E driving the generator 14 is increased due to the influence of the steering-by-wire type steering device 11 whose operation and stoppage are repeated at short time intervals.

Although the embodiments of the present invention have been described in detail, it will be understood that the present invention is not limited to the above-described embodiments, and various modifications in design may be made without departing from the subject matter of the invention defined in the claims.

For example, the steering-by-wire type steering device 11 as a steering device in which there is no mechanical connection between the steering wheel and the steering gear box has been illustrated in the embodiments, but the steering device according to the present invention may be an electric power steering device having a larger assisting force. This is because when the function of the electric power steering device is stopped, it is difficult to continue the steering by only arm strength of the driver.

What is claimed is:

1. A battery load power detecting system for detecting a load power of a battery connected to a load group including a steering device adapted to provide a steering torque by a motor and to a generator driven by an engine, the system comprising:
a voltage sensor which detects a voltage at a terminal of the battery;
a generator current sensor which detects a current supplied from the generator to at least one of the battery and the load group;
a load current sensor which detects a current supplied from at least one of the generator and the battery to the load group; and
a battery load power calculating means for calculating a load power of the battery based on the voltage detected by the voltage sensor, the current detected by the generator current sensor and the current detected by the load current sensor,
wherein the load current sensor comprises a first load current sensor which detects a current supplied from the battery to the steering device, and a second load current sensor which detects a current supplied from at least one of the generator and the battery to all members of the load group excluding the steering device, and wherein the battery load power calculating means controls an amount of power generated by the generator based on the current detected by the second load current sensor.

2. A battery load power detecting system for detecting a load power of a battery connected to a load group including a steering device adapted to provide a steering torque by a motor and to a generator driven by an engine, the system comprising:
a voltage sensor which detects a voltage at a terminal of the battery;
a generator current sensor which detects a current supplied from the generator to at least one of the battery and the load group;
a load current sensor which detects a current supplied from at least one of the generator and the battery to the load group; and
a battery load power calculating means for calculating a load power of the battery based on the voltage detected by the voltage sensor, the current detected by the generator current sensor and the current detected by the load current sensor, wherein the load current sensor comprises a single sensor, and wherein the battery load power calculating means controls an amount of power generated by the generator based on the current detected by the load current sensor.

3. A battery load power detecting system for detecting a load power of a battery connected to a load group including a steering device adapted to provide a steering torque by a motor and to a generator driven by an engine, the system comprising:

a voltage sensor which detects a voltage at a terminal of the battery;

a generator current sensor which detects a current supplied from the generator to at least one of the battery and the load group;

a load current sensor which detects a current supplied from at least one of the generator and the battery to the load group; and a battery load power calculating means for calculating a load power of the battery based on the voltage detected by the voltage sensor, the current detected by the generator current sensor and the current detected by the load current sensor, wherein the battery load power calculating means calculates a remaining capacity of the battery from a multiplied value of the load power of the battery.

4. A battery load power detecting system according to claim 1, wherein the battery load power calculating means calculates a remaining capacity of the battery from a multiplied value of the load power of the battery.

5. A battery load power detecting system according to claim 2, wherein the battery load power calculating means calculates a remaining capacity of the battery from a multiplied value of the load power of the battery.

6. A battery load power detecting system for detecting a load power of a battery connected to a load group including a steering device adapted to provide a steering torque by a motor and to a generator driven by an engine, the system comprising:

a voltage sensor which detects a voltage at a terminal of the battery;

a generator current sensor which detects a current supplied from the generator to at least one of the battery and the load group;

a load current sensor which detects a current supplied from at least one of the generator and the battery to the load group; and a battery load power calculating means for calculating a load power of the battery based on the voltage detected by the voltage sensor, the current detected by the generator current sensor and the current detected by the load current sensor, wherein the battery load power calculating means calculates the load power of the battery by multiplying a difference between both the detected currents by the voltage at the terminal of the battery detected by the voltage sensor.

7. A battery load power detecting system for detecting a load power of a battery connected to a load group including a steering device adapted to provide a steering torque by a motor and to a generator driven by an engine, the system comprising:

a voltage sensor which detects a voltage at a terminal of the battery;

a generator current sensor which detects a current supplied from the generator to at least one of the battery and the load group;

a load current sensor which detects a current supplied from at least one of the generator and the battery to the load group;

a battery load power calculating means for calculating a load power of the battery based on the voltage detected by the voltage sensor, the current detected by the generator current sensor and the current detected by the load current sensor; and a warning means which emits a warning when a remaining capacity of the battery is smaller than a threshold value.

8. A battery load power detecting system according to claim 3, further comprising a warning means which emits a warning when a remaining capacity of the battery is smaller than a threshold value.

9. A battery load power detecting system for detecting a load power of a battery connected to a load group including a steering device adapted to provide a steering torque by a motor and to a generator driven by an engine, the system comprising:

a voltage sensor which detects a voltage at a terminal of the battery;

a generator current sensor which detects a current supplied from the generator to at least one of the battery and the load group;

a load current sensor which detects a current supplied from at least one of the generator and the battery to the load group; and a battery load power calculating means for calculating a load power of the battery based on the voltage detected by the voltage sensor, the current detected by the generator current sensor and the current detected by the load current sensor, wherein the steering device is a steering-by-wire steering device.

* * * * *